2 Sheets—Sheet 2.

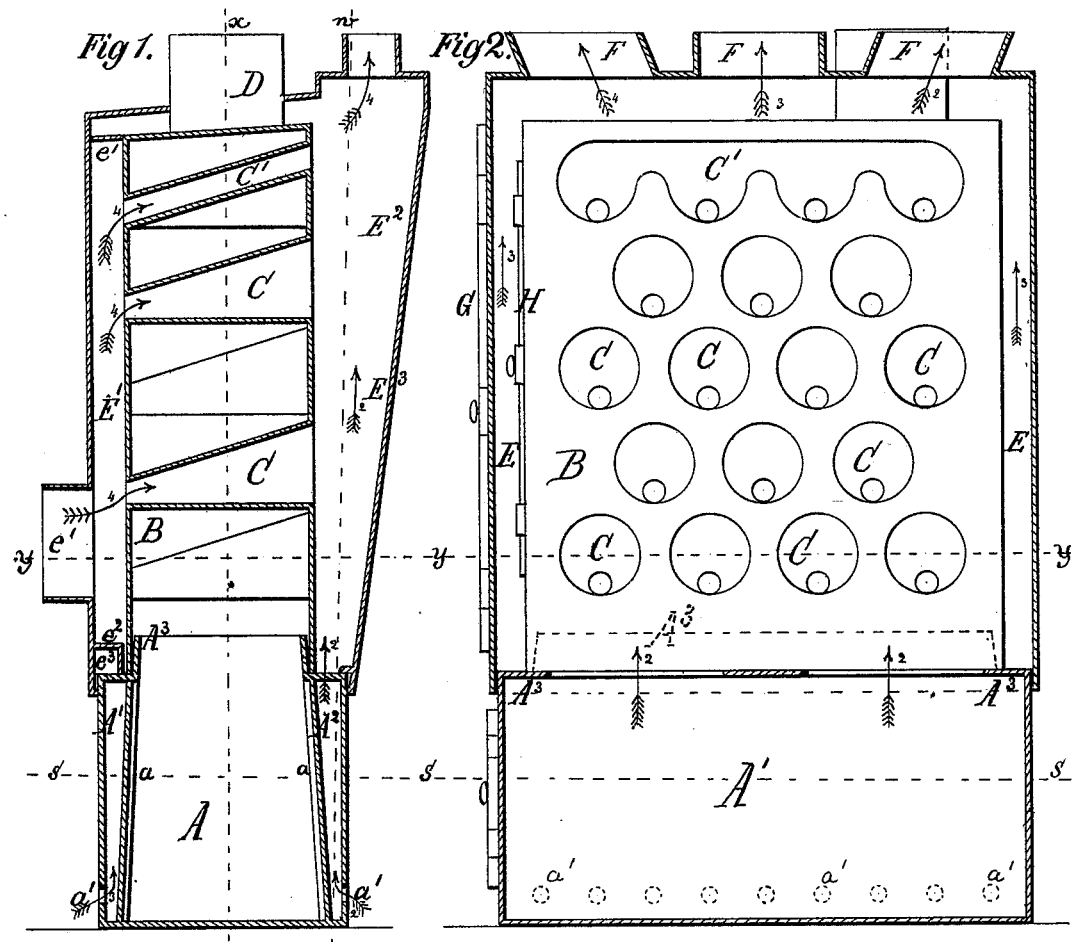
H. PURDY.
HEAT-EXTRACTING APPARATUS.
No. 176,445. Patented April 25, 1876.
2 Sheets—Sheet 1.

H. PURDY.
HEAT-EXTRACTING APPARATUS.

No. 176,445. Patented April 25, 1876.

Witnesses: J. T. Theodore Laney, J. S. Slater.

Inventor: Hiram Purdy by Mason Fenwick & Lawrence Attys

N. PETERS, PHOTO-LITHOGRAPHER, WASHINGTON, D. C.

UNITED STATES PATENT OFFICE.

HIRAM PURDY, OF BURLINGTON, IOWA.

IMPROVEMENT IN HEAT-EXTRACTING APPARATUS.

Specification forming part of Letters Patent No. 176,445, dated April 25, 1876; application filed February 11, 1876.

*To all whom it may concern:*

Be it known that I, HIRAM PURDY, of Burlington, in the county of Des Moines and State of Iowa, have invented a new and Improved Heat-Extracting Apparatus, which improvement is fully set forth in the following specification, reference being had to the accompanying drawings, in which—

Figure 4:
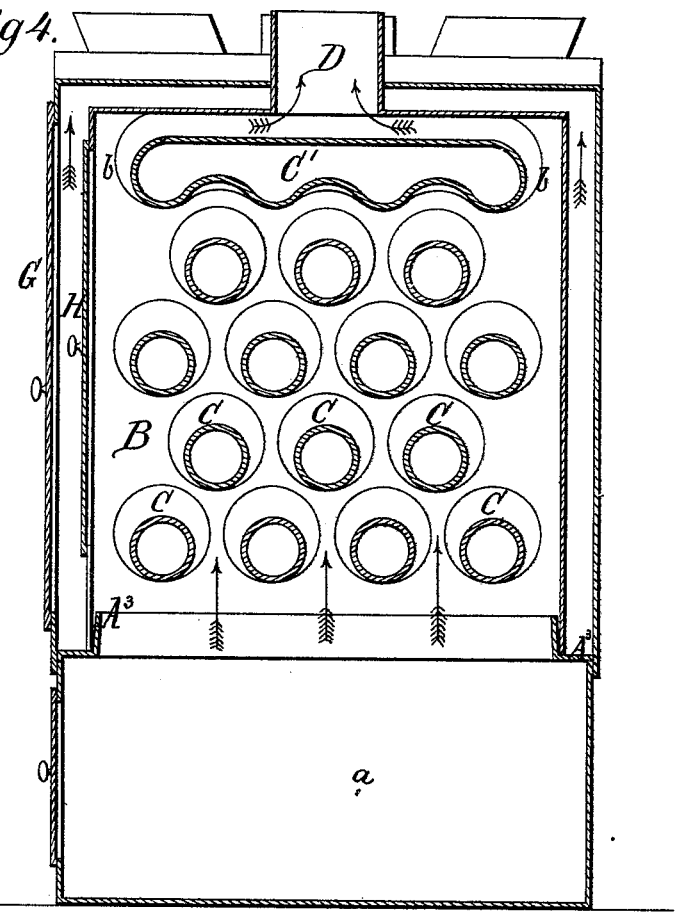
Figure 5:
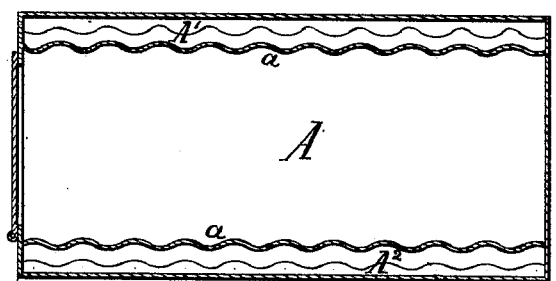
Figure 6:
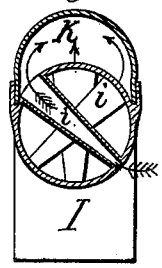
Figure 7:
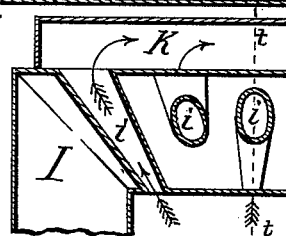

Figure 1 is a central vertical cross-section of my improved heater. Fig. 2 is a vertical longitudinal section of the heat-extractor proper in the line $x$ $x$ of Fig. 1. Fig. 3 is a horizontal section of the same in the line $y$ $y$ of Figs. 1 and 2. Fig. 4 is a vertical longitudinal central section of the same in the line $w$ $w$ of Fig. 1. Fig. 5 is a horizontal section of the heater in the line $s$ $s$ of Figs. 1 and 2. Fig. 6 is a vertical section of the smoke-pipe in the line $t$ $t$ of Fig. 7. Fig. 7 is a vertical longitudinal section of the same.

The nature of my invention consists in certain constructions, combinations, and arrangements of parts in a heating apparatus, as hereinafter described and specifically claimed.

By my improvements the air from the outside is admitted in different currents, and caused to meet at an elevated point above the fire-chamber, and one current or body of the inflowing air is caused to pass through a tapering chamber around the fire-pot, and to become partially heated as it rises above the fire-pot, and a portion of it circulates around the heating-drum, and the other current or body of air is caused to pass through transverse conical passages of the heating-drum above the fire-pot, being induced to flow through these passages by the draft and the effect of rising heated air from the chamber around the fire-pot, and by the rarefaction of the air in the transverse passages by the flame from the fire-pot. The several currents of air mingle at the back of the drum in a flaring space, and the whole are there brought to a condition for pleasantly and healthfully heating rooms and apartments.

The construction and arrangement and combination of the different parts of the heating apparatus are such that a very large amount of heating-surface, a free flow and circulation of the heated air are obtained in a very compact apparatus, and the heating of a large area in a very short time, and with small expense for fuel, is effected.

In the drawings, A represents a furnace or fire-box, with inclined corrugated side walls $a$. This fire-box is made with double walls on its two sides, and single-walled at its front and rear end. In the outer side walls, near their bottom, a number of holes, $a'$, are made for the admission of fresh air into the chamber $A^1$ formed at the front and rear of the fire-box, which air is conducted, after being partly heated in the fire-box, into a chamber or jacket presently described. The smoke and gases are conducted from the fire-box A, through its open top $A^3$, into the drum B, which is traversed by a number of flaring tubes, C, which are constructed and arranged, by preference, with their bottom parts on a horizontal line, or nearly so. Above the top row of these tubes a broad single tube, C′, of flaring form, like those C, is arranged, and this tube is so constructed and arranged that its bottom forms a corrugated ceiling, and there is left but a small passage, $b$, at either side sufficiently large for the smoke to pass, at a reduced temperature, around into the smoke-pipe collar D. The drum B is inclosed in a jacket, E, of greater size than the drum in all directions, and the space around the drum is divided into two sections by two vertical partition-walls, $e$, Fig. 3. The section $E^1$, thus formed, has one or more openings, $e^1$, for the admission of fresh air, which is heated by the wall of the drum B; and by means of the draft, which is caused by the ascending sheet of partially-heated air from the jacket around the fire-pot, and by the rarefaction of the air in the cones by the fire in the fire-pot, the cool air from the outside is drawn through the small openings of the conical flues into the flaring section $E^2$ of the jacket, said section $E^2$ being in communication with the front and end spaces between the jacket and drum, and having hot-air exits at its top. To prevent the escape of air before it is heated from the compartment $E^1$, a horizontal partition, $e$, is inserted between the jacket E and the drum B. The lower end of this compartment is shut off from the flaring section $E^2$ by an angular partition, $e^2$, which fits down against the perforated partition of the fire-box compartment $A^1$, on one side of the fire-box A. The air from the said compartment $A^1$ is passed up through perforations $e^3$, against the partition $e^2$, and caused to circulate along this partition until it reaches the ends of the drum and passes into the upper compartments E and $E^2$, while the air from the compartment $A^2$, on the other side of the fire-box, passes straight up into the said upper compartment. The top of the fire-box A is provided with a stepped rim at its upper open end $A^3$, upon which the lower part of the drum B rests with a snug fit. From the upper part of the jacket E the hot air is conducted through collars E into the flues of the building which is to be heated.

To effect an easy access to the inner parts of the drum and jacket for the purpose of cleaning, I provide the apparatus with doors G H, which may be fitted air or gas tight.

To secure a uniform supply of hot air from each conical flue C, and to prevent the crowding of the said supply near the top of the compartment $E^2$, the plate $E^3$, opposite the large or discharge ends of the conical flues C, is inclined outward from the drum B as it rises, thus widening the said compartment $E^2$ at the top, and giving ample room for the free expansion and escape of hot air from the cones.

The smoke-pipe I, attached to the collar D, is traversed in different directions by conical flues $i$, with their small ends turned downward, and opened to the atmosphere. The top of the said smoke-pipe is provided with a removable hot-air reservoir, K, into which the said flues $i$ discharge their heated air, and from which it may be conducted, at pleasure, to other parts of the building.

It is easily seen that the construction of my described apparatus is not only simple and of very easy access to all its parts, but it is also very easy to be taken apart and to be moved and set up again, since for such operation it is only necessary to remove the stove-pipe, then to lift off the jacket, and, finally, to lift off the drum, which may be done by any person of ordinary intelligence.

The apparatus for heating air or superheating steam is very effective, as it permits a very large volume of air to pass through it, and heats directly one portion, and effects a mingling of slightly-heated and highly-heated air before the same passes into the rooms to be warmed. The result is a very pleasant and effective heating of buildings, with a small expense for wood or other fuel.

Having thus described my invention, what I claim as new, and desire to secure by Letters Patent, is—

1. In a heating apparatus, the combination of the drum, provided with conical air-flues, which run from front to back, and are flared from their receiving to their discharging end, and an air-jacket inclosing the receiving and discharging ends of the said flues, substantially as and for the purpose described.

2. The combination of the broad flaring top flue $C'$, having its bottom corrugated, the flaring flues C, enlarged from their receiving to their discharging end, and the drum B, substantially as and for the purpose described.

3. The double-walled fire-box A, having walls $a$ and openings $a'$ in its outer walls, in combination with the conical flue C, drum B, and jacket, with flaring sides $E^3$ and inlet and outlet passages, substantially as and for the purpose set forth.

4. In combination with the heating apparatus, the smoke-pipe I, having conical flues $i$ and a reservoir, K, substantially as and for the purpose described.

5. The heater, having its drum provided with the conical flues C, which run from front to back, and are flared from their receiving to their discharging ends, and its jacket divided into the compartments $E^1$ and $E^2$, substantially as and for the purpose described.

6. The combination of the fire-box A, having compartments $A^1$ $A^2$ and the compartment $E^2$, substantially as and for the purpose set forth.

7. The combination of the fire-box A, the drum B, transverse conical flues C, and the jacket E, the elements of the combination being constructed and combined substantially as herein described.

8. The combination of the drum, provided with conical flues C, and the fire-box, having compartment $A^2$, and the jacket, having compartment $E^2$, substantially as and for the purpose described.

In testimony that I claim the foregoing as my own I hereunto set my hand in presence of two witnesses.

HIRAM PURDY.

Witnesses:
  A. DELAHAYE,
  MORRIS WILLNER.